United States Patent Office.

GEORGE NIMMO, OF JERSEY CITY, NEW JERSEY.

*Letters Patent No.* 42,959, *dated May* 31, 1864; *reissue No.* 2,621, *dated May* 21, 1867.

IMPROVEMENT IN THE MANUFACTURE OF BLACK-LEAD CRUCIBLES.

The Schedule referred to in these Letters Patent and making part of the same.

TO ALL WHOM IT MAY CONCERN:

Be it known that I, GEORGE NIMMO, of Jersey City, in the county of Hudson, and State of New Jersey, have invented, made, and applied to use a certain new and useful Improvement in Black-Lead Crucibles; and I do hereby declare the following to be a full, clear, and exact description of the said invention, and of the objects attained by the same.

In the manufacture of black-lead or plumbago crucibles it has been usual to mix the new black lead with certain proportions of clay and sand. The new black lead, when exposed to the action of heat, gives off gaseous matter that renders it necessary to burn the crucibles with great care, in costly kilns, before they are in a condition for use or for sale; and even then there is often a loss by the crucibles breaking in the burning; and when in use said crucibles seldom stand for more than three to five heats of steel, and eighteen to thirty heats of brass, before they become valueless.

The nature of my said invention consists in the use of calcined plumbago in the manufacture of crucibles, whereby the crucibles are rendered less liable to break and crack in the manufacture, and are more durable in use.

The calcining of the black lead previous to mixing it drives off the gaseous materials and renders the pots much less liable to break when heated; hence I am able to make much better pots, and in some instances the pots may be sold and used without any previous burning; or said crucibles may be subjected to an ordinary open fire, or other suitable means for baking, after drying, and before sending to market.

The proportion of ingredients employed by me may be stated as follows: Four parts, by measure, of plumbago to about one part of fire sand; one and a half to two parts of German clay, and about one-half part of China clay or kaolin. These are to be thoroughly mixed together with the proper amounts of water, and moulded or formed into the pots or crucibles in any desired manner.

The proportion of four parts of plumbago, before mentioned, is to be composed of old pots ground up, or of calcined plumbago, and of uncalcined plumbago, in proportions varying from three parts of new and one part of calcined black lead or old pots to three parts of calcined plumbago or old pots and one part of new black lead, according to the quality of pot or crucible to be produced and the condition of the materials.

What I claim, and desire to secure by Letters Patent, is—

The manufacture of crucibles from a composition of which calcined plumbago or old pots ground forms a part, substantially as set forth.

In witness whereof I have hereunto set my signature this twenty-third day of April, A. D. 1867.

GEORGE NIMMO.

Witnesses:

CHAS. H. SMITH,

GEO. D. WALKER.